Jan. 29, 1957  J. PHILLIPS ET AL  2,779,710
PROCESS OF UPGRADING PETROLATUM
Filed July 1, 1953
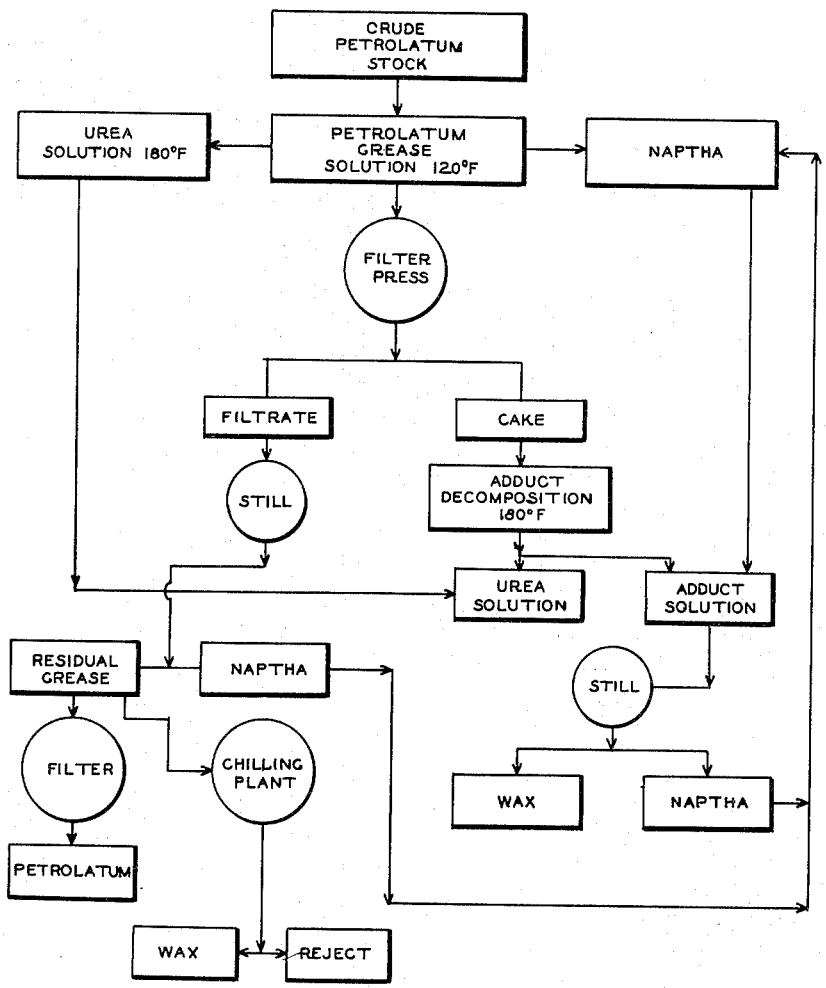
INVENTOR
JOSEPH PHILLIPS
ANTHONY KINSEL
BY
ATTORNEY

United States Patent Office 2,779,710
Patented Jan. 29, 1957

2,779,710

PROCESS OF UPGRADING PETROLATUM

Joseph Phillips and Anthony Kinsel, Petrolia, Pa., assignors to L. Sonneborn Sons, Inc., a corporation of Delaware Application July 1, 1953, Serial No. 365,348

3 Claims. (Cl. 196—17)

This invention relates to new and useful improvements in petrolatum.

One object of the invention is a new petrolatum product of superior characteristics and properties;

Another object of the invention is a novel method for improving the characteristics and properties of a finished petrolatum;

The foregoing and still further objects of the invention will be apparent from the following description:

Most of the conventional petrolatums exhibit strong tendencies towards bleeding or sweating, a relatively short fibre and will appreciably soften upon mechanical working. The only petrolatums which show these objectionable characteristics to a lesser degree are those made from carefully chosen and carefully refined Pennsylvania crudes. Even these leave much to be desired, particularly with respect to ductility, smoothness of appearance and other qualities including the tendency to soften when being mechanically worked. Furthermore, and aside from the fact that the care in selection and refining of the Pennsylvania crudes appreciably adds to the petrolatum costs, these crudes are continually becoming more unavailable.

It has been discovered in accordance with this invention that petrolatum greases may be upgraded by contacting with urea under conditions as hereinafter specified, said contacting resulting in the removal therefrom of urea adduct convertible high-melting point straight chain hydrocarbons. The resulting products produce petrolatums of unusually long fibre, low bleeding tendency, and little, if any, softening after mechanical working. In fact the new petrolatum is often even stiffer after working. The novel petrolatum products are smooth in appearance and often have a ductility in excess of 30.

The crude petrolatum may be subjected to contact with urea in accordance with the invention, either in its original state and adsorbent-refined to a minimum color value, or after at least partial refining including such adsorbent treatment for minimum color value. The minimum color value required in accordance with the invention for a petrolatum material is that obtained by refining with a conventional petrolatum adsorbent such as bauxite, fuller's earth and the like, to a Lovibond color (½" cell) of 35Y5R. A petrolatum grease material which is not adsorbent-refined to at least this value will not satisfactorily respond to the treatment in accordance with the invention to obtain the upgraded products herein specified.

In the practical application of the upgrading method in accordance with the invention and the obtaining of a novel petrolatum product of superior properties and qualities, a solution of petrolatum stock having an adsorbent refined color value of not less than 35Y5R (½" cell Lovibond) in an organic solvent therefor, is intimately contacted with aqueous urea at a temperature of about 100–150° F. until substantial completion of adduct formation between the urea and hydrocarbons in the petroleum grease is completed. The completion of the adduct formation may be determined by periodic checking of samples from the reaction mix. Once of course for given reaction conditions, the time of reaction has been determined, the same time may be thereafter applied for treatments under similar conditions. In most cases, however, several hours of intimate contact, preferably secured by continuous vigorous stirring, will bring about the desired result. After completion of adduct formation the organic solvent solution is separated from the solids in the mix, such as by filtration, whereupon the organic solvent solution is worked up to recover therefrom the dissolved petroleum grease material which may be preferably accomplished by distilling the solvent.

The solvent used in accordance with the invention should be one substantially neutral to urea at the temperature of urea adduct formation to which the petroleum grease organic solvent solution is subjected. Solvents giving good results are substantially aliphatic hydrocarbons of the C-5 to C-15 range, the preferred solvent of these being petroleum naphtha. Good results are also obtained with benzol and its homologues, as well as with incompletely halogenated aliphatic, aromatic and aralkyl hydrocarbons and their ethers, the preferred members of the latter being ethylene dichloride and dichlorethyl ether. The crude petrolatum concentration in such solution is preferably 10–30% by weight of petroleum grease in the solvent. Solution is advantageously effected within a temperature range of about 125–175° F.

The aqueous urea used in the practice of the method in accordance with the invention is preferably one so concentrated that a minimum, and preferably no water, is carried over into the ultimate solute obtained after the adduct formation and removal of solids by filtration. A urea solution substantially saturated at about 140–225° F. and preferably one saturated at about 200° F. gives especially good results.

The following table shows a comparison of characteristics of two crude petrolatum stocks (I and II) and the petrolatum derived therefrom, giving in all cases the data for the untreated products, as well as for those treated in accordance with the invention:

TABLE I

|  | Crude Petrolatum, Stock I | | Crude Petrolatum, Stock II | |
|---|---|---|---|---|
|  | Untreated | Treated[1] | Untreated | Treated[1] |
| Congealing Pt. (°F.)[3] | 168 | 135 | 150 | 113 |
| Penetration (N) | 25 | 62 | [2]75 | [2]175 |
| Saybolt Visc. at 210° F. (Secs.) | 80 | 96 | 97 | 110 |

PETROLATUM THEREFROM

| | | | | |
|---|---|---|---|---|
| Congealing Pt. (°F.) | 148 | 121 | 140 | 113 |
| ASTM Consistency | 180 | 180 | 180 | 175 |
| Hardness Loss | 15 | −45 | 30 | 2 |
| Bleeding No. | 17 | 11 | 15 | 7 |
| Ductility | 17 | 32 | 21 | 40 |
| Appearance | grainy | smooth | grainy | smooth |

[1] In accordance with the invention.
[2] ASTM consistency (D937–49T).
[3] ASTM Method D-038-49.

The following represents a typical example of the treatment procedure in accordance with the invention:

Example

Dissolve 20 grams of crude petrolatum stock in 80 cc. of solution naphtha at about 150° F. Add to it a saturated solution of urea in water at 200° F.—15 cc. $H_2O$ plus 90 grams urea. Stir vigorously and allow the treat to cool to about 120° F. Stir until adduction is substantially completed. This takes about 2–5 hours depending on the rate of stirring. Filter the treat through a filter under suction and wash the precipitated adduct with warm solution naphtha. If necessary, re-slurry the adduct with warm solution naphtha and re-filter.

The filtrate is reduced in a still to remove the solution naphtha. The residue is in every case a far superior material for petrolatum than the original wax or petroleum grease.

In order to recover urea from the adduct and also recover as a valuable by-product the hydrocarbons removed in the form of urea adduct, the precipitated washed adduct is dumped into a tank indirectly heated. Sufficient make-up water is added to replace the water lost during the filtration operations and about 25 cc. solution naphtha. The wax is heated to 210° F.

At this temperature the urea goes into a water solution and the wax dissolves in the naphtha and this top layer is withdrawn. The adducted wax solution is reduced in a still to remove the solution naphtha. The resultant wax is a high melting point, hard (straight chain) hydrocarbon wax.

The hot lower urea solution layer (a saturated urea in water solution at 200° F.) is ready for re-use as in the above step of adduct formation.

For the purpose of demonstrating by way of further illustrations the significant increase obtained in ductility when proceeding in accordance with the invention, a number of crude petrolatum stocks from different sources were treated in accordance with the foregoing example. The ductility values obtained for these stocks are set forth in the following Table II:

TABLE II

| Crude Petrolatum Stock Tested | Ductility | | |
| --- | --- | --- | --- |
| | Before Treatment | After Treatment | Percent Increase |
| III | 15 | 20 | 33 |
| IV | 16 | 21 | 30 |
| V | 16 | 28 | 75 |
| VI | 21 | 40 | 90 |
| VII | 29 | 40 | 40 |
| VIII | 16 | 30 | 90 |
| IX | 17 | 32 | 40 |
| X | 36 | 41 | 15 |

It will be noted from the foregoing table that an improvement in the difficulty of the various products treated is normally between about 30 and 90%.

In all of the treatments and products hereinabove specified in accordance with Tables I and II and the above example, the crude petrolatum stock or grease was one which had been subjected to at least partial decolorizing treatment with a conventional petroleum adsorbent, such as, for instance, fuller's earth, bauxite and similar conventionally known materials, to yield a color value of not darker than 35Y5R (½" cell, Lovibond color). It has been found that this partial color refining by adsorbent contact in accordance with otherwise conventionally practiced petroleum refining procedures is critical in the practice of the invention in that no or only insufficient, adduct formation takes place when the product is not so refined to such color value, thus not permitting the upgrading benefits to be achieved in accordance with this invention.

In lieu of the naphtha solution specified in the above example, petroleum stock solutions of other solvents herein specified may be used with equally advantageous results. As indicated by slightly higher yields of adduct formation, some of the solvents useful in accordance with the invention are somewhat more effective than others. Thus, whereas the use of naphtha solutions yields in a given case, for instance, an adduct formation of about 14% by weight with ASTM (D217-49) melting pt. of 186° F. and a needle penetration of 5, the following other solvents give the respective values set forth for the same, as follows:

Benzol 15% by weight adduct ASTM (D217-49) melting pt. 189° F., pen. (N) 17;

Diethylene chloride yield 16% adduct by weight ASTM (D217-49) melting pt. 191° F., pen. (N) 7;

Dichlorethyl ether yield 19% adduct by weight ASTM (D217-49) melting pt. 186° F., pen. (N) 12.

The melting point and congealing point values herein expressed are the medium of the values of the melting point range of the products involved. The penetration (N) values herein are those of conventionally determined needle penetration (ASTM method D-5). The bleeding number herein referred to is a measure of the sweating or bleeding of oil from a petrolatum material and is obtained by permitting a drop of molten petrolatum to solidify on a filter paper and storing the same for 24 hours, whereupon the size of the ring of oil formed on the filter paper around the petrolatum drop is measured, giving the bleeding number; the larger the ring, the greater the bleeding or the sweating tendency of the petrolatum. The method is described in the Kinsel and Phillips article in the Petroleum Refiner of August 1948.

The ductility number referred to herein is obtained by extruding a slender cylindrical column of petrolatum through an orifice, allowing the column to break under its own weight, and measuring the length in millimeters of the thread-tipped cone which remains attached to the apparatus. The length of this cone is proportional to the total elongation undergone by the column before breaking; its length measured in millimeters is reported as the ductility. Details of the determination of the ductility number of petrolatum may be ascertained from the Kinsel and Schindler article in the Petroleum Refiner of June 1948.

The hardness loss number referred to herein is determined in accordance with conventional practice, in which petrolatum is placed into a cup and worked with a perforated piston for a predetermined number of strokes. It is then subjected to cone penetrometer determination which establishes the depth in millimeters to which a cone of predetermined size and weight will sink into the grease at a specified temperature and pressure and for a specified time. The cone penetrometer number of the unworked grease is determined in accordance with ASTM D937-49T. That of the worked grease is determined in accordance with ASTM D217-48. The differential between the cone penetrometer numbers obtained in each ASTM determination gives the numerical value for the loss in hardness of the product.

In the practical refining operation of the application of this invention the preferred procedure is to give the crude stock a preliminary adsorbent refining treatment to the desired maximum, or preferably lighter, color value as specified herein, and to then have the same pass through the various operations as designated in the annexed flow sheet. Between the steps marked "residual grease" and "petrolatum" as shown on the flow sheet, the residual grease is subjected to a further color refining treatment in conventional manner by percolation, in molten condition, with a petroleum refining adsorbent, such as, for instance, bauxite or activated bauxite or fuller's earth. The degree of color removal is carried by repeated or prolonged contact as the case may be in accordance with normal practice to yield the various commercial petrolatum products including, for instance, amber and snow white, including the various grades of intermediate color values.

Though the invention in accordance with the preferred embodiment thereof has been hereinabove described in connection with contact with aqueous urea, it is also possible to obtain good petrolatum upgrading results with the use of dry urea, and if necessary, suitable activators such as alcohols or other materials being added, as is otherwise conventionally understood in the art of urea adduct formation.

We claim:

1. Process of upgrading a petrolatum to produce a petrolatum of improved ductility, which comprises treating a crude petrolatum with a decolorizing adsorbent to a color value for said petrolatum of not darker than 35Y5R (½" cell Lovibond color) and thereafter treating the petrolatum so produced with urea under conditions of adduct formation, separating the adduct so formed and recovering the residual petrolatum of improved ductility.

2. Process of upgrading a petrolatum to produce a petrolatum of improved ductility, which comprises treating a crude petrolatum with a decolorizing adsorbent to a color value for said petrolatum of not darker than 35Y5R (½" cell Lovibond color), and thereafter treating the petrolatum so produced with urea, under conditions of adduct formation, in amount sufficient and under conditions of substantially complete adduct formation, separating the adduct so formed and recovering the residual petrolatum of improved ductility.

3. Process of upgrading a petrolatum to produce a petrolatum of improved ductility, which comprises treating a crude petrolatum in solution in an organic solvent with a decolorizing adsorbent to a color value for said petrolatum of not darker than 35Y5R (½" cell Lovibond color), and thereafter treating the petrolatum so produced with urea under conditions of adduct formation, separating the adduct so formed and recovering the residual petrolatum of improved ductility.

References Cited in the file of this patent

UNITED STATES PATENTS

| | | |
|---|---|---|
| 2,499,820 | Fetterly | Mar. 7, 1950 |
| 2,546,328 | Arabian et al. | Mar. 27, 1951 |
| 2,642,377 | Fetterly | June 16, 1953 |
| 2,663,671 | Wiles et al. | Dec. 22, 1953 |

OTHER REFERENCES

Warth: "The Chemistry and Technology of Waxes," pages 240, 245, 246, and 247 (1947), published by Reinhold Publishing Corp., New York, N. Y.